US008873158B2

(12) United States Patent
Nanba

(10) Patent No.: US 8,873,158 B2
(45) Date of Patent: Oct. 28, 2014

(54) ZOOM LENS AND IMAGE PICKUP APPARATUS EQUIPPED WITH SAME

(75) Inventor: Norihiro Nanba, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 125 days.

(21) Appl. No.: 13/335,052

(22) Filed: Dec. 22, 2011

(65) Prior Publication Data
US 2012/0162776 A1 Jun. 28, 2012

(30) Foreign Application Priority Data

Dec. 27, 2010 (JP) ................................. 2010-290046

(51) Int. Cl.
*G02B 15/14* (2006.01)
*G02B 15/177* (2006.01)

(52) U.S. Cl.
CPC .................................. *G02B 15/177* (2013.01)
USPC ......................................... 359/682; 359/676

(58) Field of Classification Search
USPC ................... 359/676, 680–682, 689
See application file for complete search history.

(56) References Cited

U.S. PATENT DOCUMENTS

| | | | | |
|---|---|---|---|---|
| 6,308,011 | B1 * | 10/2001 | Wachi et al. | 396/72 |
| 7,215,482 | B2 * | 5/2007 | Matsusaka | 359/682 |
| 7,450,318 | B2 * | 11/2008 | Nanba et al. | 359/689 |
| 7,477,456 | B2 | 1/2009 | Hirose | |
| 7,920,334 | B2 | 4/2011 | Shimada | |
| 8,023,198 | B2 * | 9/2011 | Masugi | 359/689 |
| 8,085,478 | B2 | 12/2011 | Nanba | |
| 2006/0072212 | A1 * | 4/2006 | Nanba et al. | 359/689 |
| 2009/0268308 | A1 * | 10/2009 | Masugi | 359/689 |
| 2009/0303611 | A1 | 12/2009 | Fujisaki et al. | |
| 2010/0091381 | A1 | 4/2010 | Katakura | |
| 2012/0008215 | A1 | 1/2012 | Katakura | |

FOREIGN PATENT DOCUMENTS

| | | |
|---|---|---|
| CN | 101852912 A | 10/2010 |
| CN | 101852914 A | 10/2010 |
| JP | 2008-170577 A | 7/2008 |
| JP | 2010-091948 A | 4/2010 |

OTHER PUBLICATIONS

Chinese Office Action cited in Chinese counterpart application No. CN201110433911.X, dated Dec. 3, 2013. English translation provided.
Japanese Office Action cited in Japanese counterpart application No. JP2010-290046, dated May 1, 2014. English translation provided.

* cited by examiner

*Primary Examiner* — James Greece
(74) *Attorney, Agent, or Firm* — Rossi, Kimms & McDowell LLP

(57) ABSTRACT

A zoom lens includes, in order from its object side, a first lens unit having a negative refractive power, a second lens unit having a positive refractive power, and a third lens unit having a positive refractive power. At a time of zooming from the wide angle end to the telephoto end, the lens units move in such a way that the distance between the first lens unit and the second lens unit decreases and the distance between the second lens unit and the third lens unit increases. The zoom lens satisfies the conditions "$0.35<|f1|/ft<0.55$" and "$1.80<Npa$", where ft is the focal length of the entire system at the telephoto end, f1 is the focal length of the first lens unit, and Npa is the average of the refractive indices of the materials of all the positive lenses in the entire system.

10 Claims, 9 Drawing Sheets

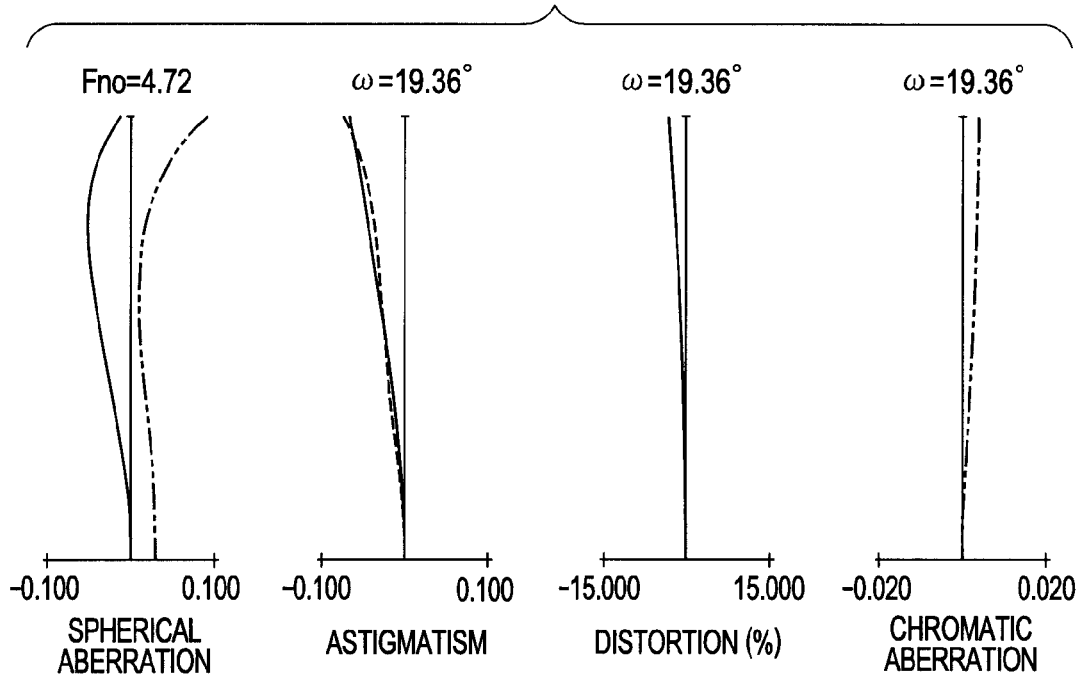
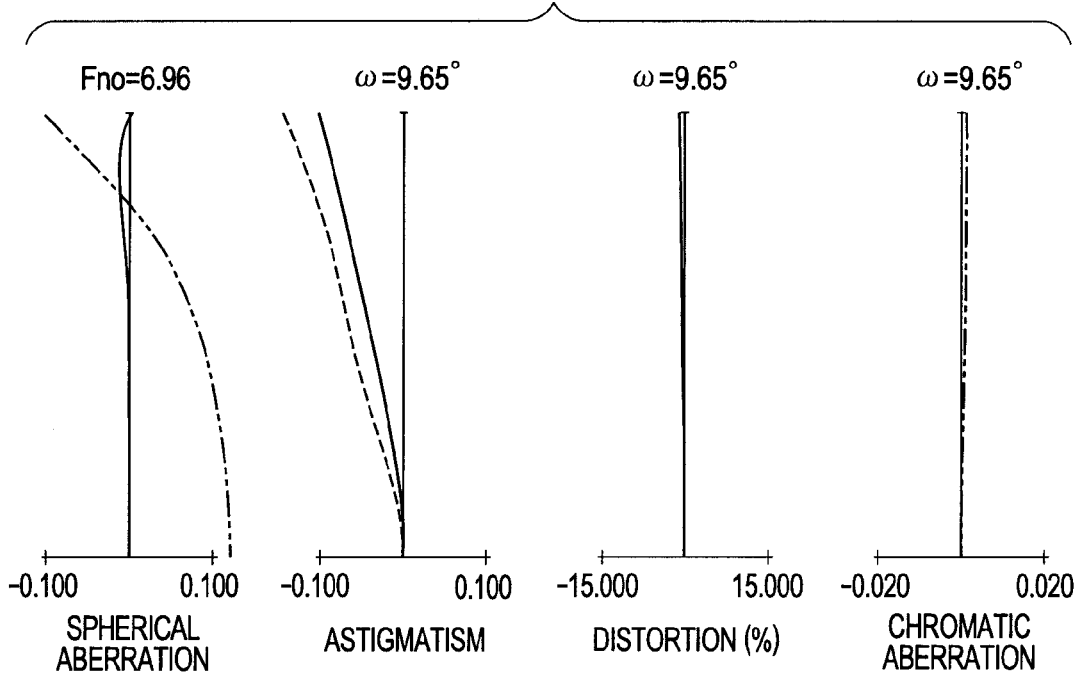

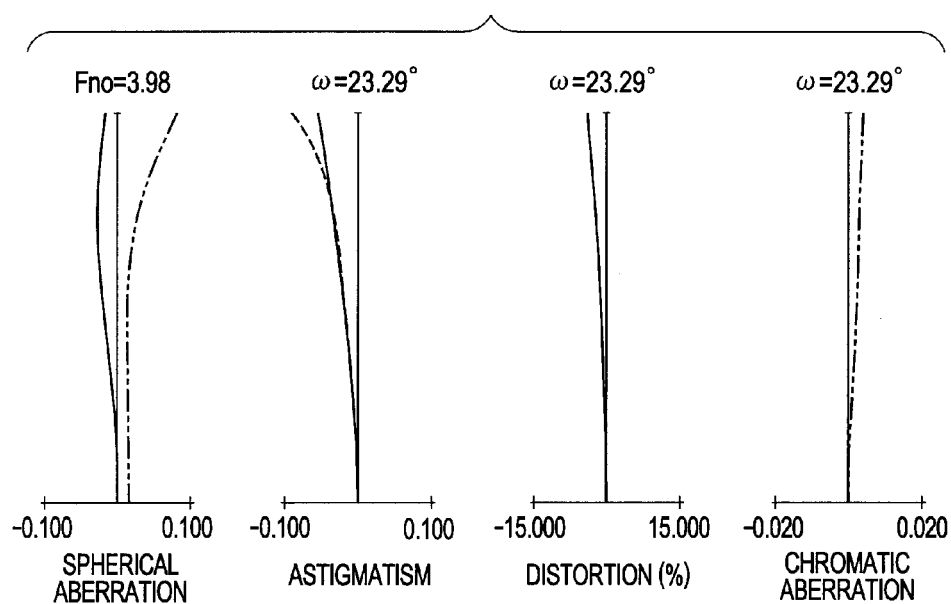
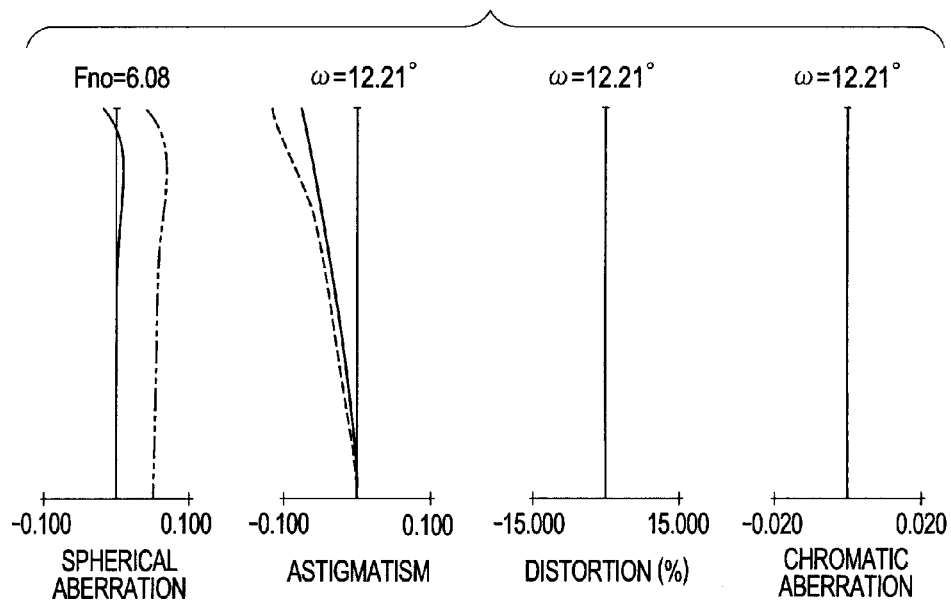

ZOOM LENS AND IMAGE PICKUP APPARATUS EQUIPPED WITH SAME

BACKGROUND OF THE INVENTION

1. Field of the Invention

The present invention relates to a zoom lens that is suitable for use in an image pickup apparatus such as a digital still camera, video camera, and TV camera.

2. Description of the Related Art

As taking optical systems for use in image pickup apparatuses, small zoom lenses having a high zoom ratio with a zoom range covering wide angles, high optical performance and short overall length are demanded. When used in a camera using a solid state image pickup element, a zoom lens is required to have a relatively long back focus, because various optical components such as a low pass filter and a color correction filter are provided between the rear end of the lens and the image pickup element in such a camera. Moreover, when used in an image pickup apparatus using an image pickup element for color images, a zoom lens is desired to have good telecentricity on the image side in order to prevent color shading.

Negative-lead zoom lenses in which a lens unit having a negative refractive power is located closest to the object side are known as zoom lenses that are small in overall size, have a long back focus and good telecentricity on the image side.

There is a known three-unit, negative-lead zoom lens including, in order from the object side to the image side, a first lens unit having a negative refractive power, a second lens unit having a positive refractive power, and a third lens unit having a positive refractive power. There is a known three-unit zoom lens of this type that is telecentric on the image side and has a long back focus and a wide field angle (as disclosed in, for example, U.S. Pat. No. 7,920,334 and United State Patent Application No. 2010/0091381).

In the three-unit zoom lens, in order to achieve high optical performance throughout the entire zoom range while making the overall size of the system small, it is important to arrange the refractive powers and lens configurations of the lens units appropriately. In particular, in order to achieve excellent optical performance with reduced curvature of field throughout the entire zoom range, it is important to appropriately select the refractive power of the first lens unit, the refractive powers and materials of the positive lenses and negative lenses used in the zoom lens system. For example, in order to achieve a flat image field throughout the entire zoom range, it is important to make the Petzval sum small. To this end, it is effective that a plurality of positive lenses be arranged to contribute to the positive refractive power of the entire system and that the positive lenses each made of a material having a high refractive index be used.

In the embodiments disclosed in U.S. Pat. No. 7,920,334, the average of the refractive indices of the materials of the positive lenses in the entire system is in a range of 1.65 to 1.71. In the case of United State Patent Application No. 2010/0091381, the average of the refractive indices of the materials of the positive lenses is in a range of 1.70 to 1.77 or less. If the refractive power is increased without increasing the number of positive lenses in the lens systems disclosed in these documents with a view to reduce the overall size, an increase in the Petzval sum will result, thus leading to strong curvature of field. In particular, if high zoom ratio and small overall size are to be achieved, it will be very difficult to achieve a flat image field throughout the entire zoom range.

An object of the present invention is to provide a zoom lens that is small in overall size and has high optical performance throughout the entire zoom range and to provide an image pickup apparatus equipped with such a zoom lens.

SUMMARY OF THE INVENTION

A zoom lens includes, in order from an object side to an image side, a first lens unit having a negative refractive power, a second lens unit having a positive refractive power, and a third lens unit having a positive refractive power, wherein at a time of zooming from a wide angle end to a telephoto end, the lens units move in such a way that the distance between the first lens unit and the second lens unit decreases and the distance between the second lens unit and the third lens unit increases, and the zoom lens satisfies the following conditions:

$$0.35 < |f1|/ft < 0.55, \text{ and}$$

$$1.80 < Npa,$$

where ft is the focal length of the entire system at the telephoto end, f1 is the focal length of the first lens unit, and Npa is the average of the refractive indices of the materials of all the positive lenses in the entire system.

Further features of the present invention will become apparent from the following description of exemplary embodiments with reference to the attached drawings.

BRIEF DESCRIPTION OF THE DRAWINGS

FIGS. 4A, 4B, and 4C are aberration diagrams of numerical embodiment 2 of the present invention respectively at the wide angle end, at an intermediate zoom position, and at the telephoto end.

FIGS. 6A, 6B, and 6C are aberration diagrams of numerical embodiment 3 of the present invention respectively at the wide angle end, at an intermediate zoom position, and at the telephoto end.

DESCRIPTION OF THE EMBODIMENTS

Preferred embodiments of the present invention will now be described in detail in accordance with the accompanying drawings.

The zoom lens according to the present invention includes, in order from the object side to the image side, a first lens unit having a negative refractive power, a second lens unit having a positive refractive power, and a third lens unit having a positive refractive power. At a time of zooming from the wide angle end to the telephoto end, the lens units move in such a way that the distance between the first lens unit and the second lens unit decreases, and the distance between the second lens unit and the third lens unit increases.

Figure 1:
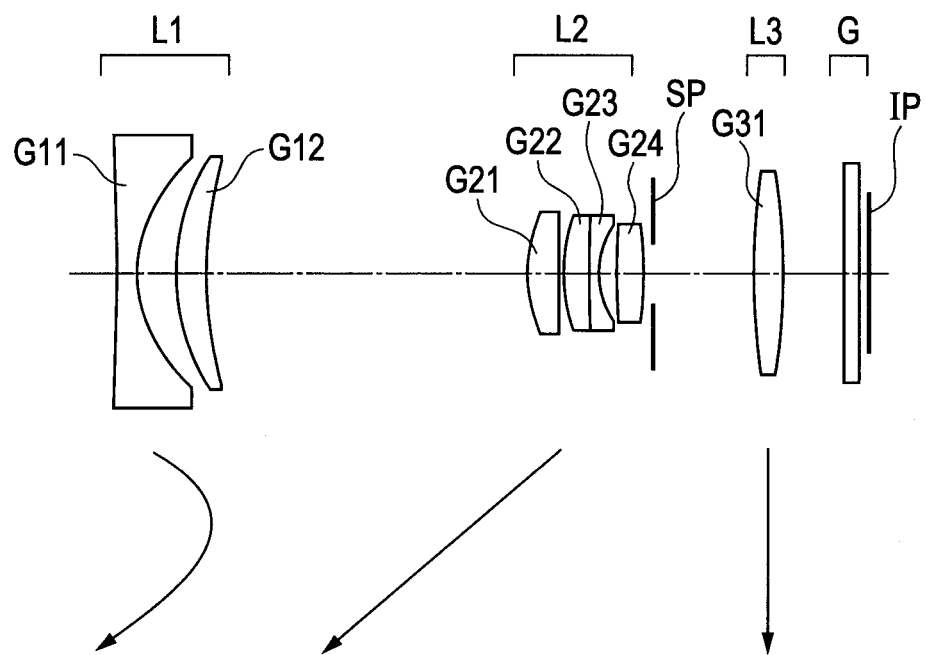
FIG. 1 is a cross sectional view of a zoom lens according to numerical embodiment 1 of the present invention.
Figure 2A:
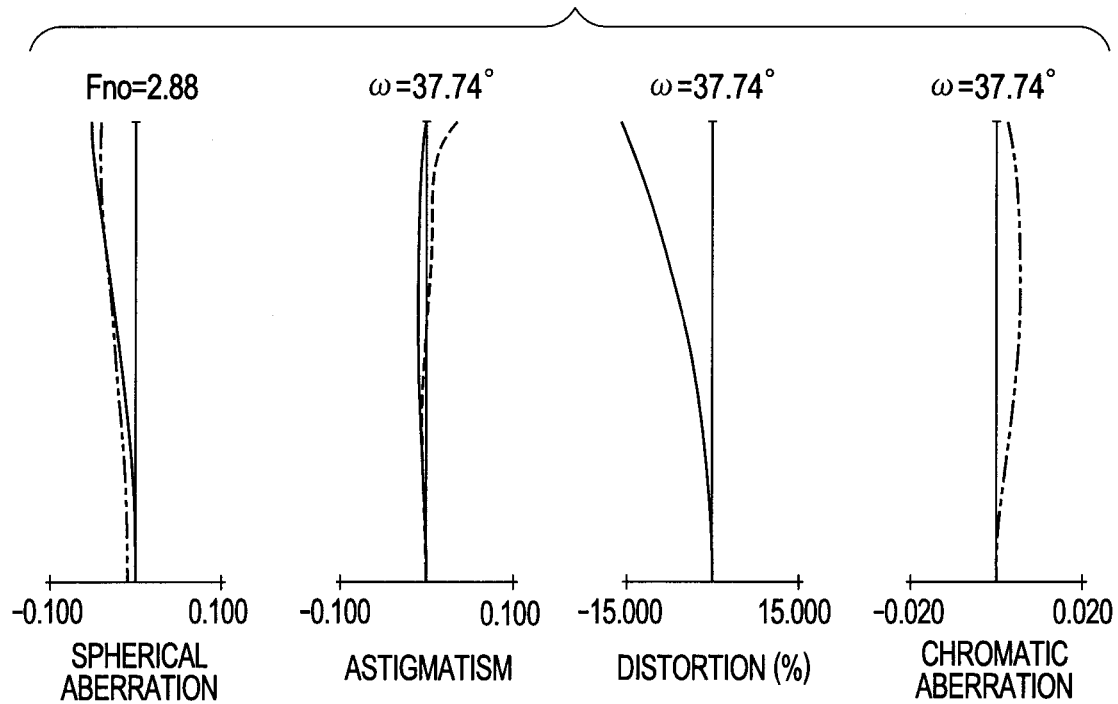
FIGS. 2A, 2B, and 2C are aberration diagrams of numerical embodiment 1 of the present invention respectively at the wide angle end, at an intermediate zoom position, and at the telephoto end.
Figure 2B:
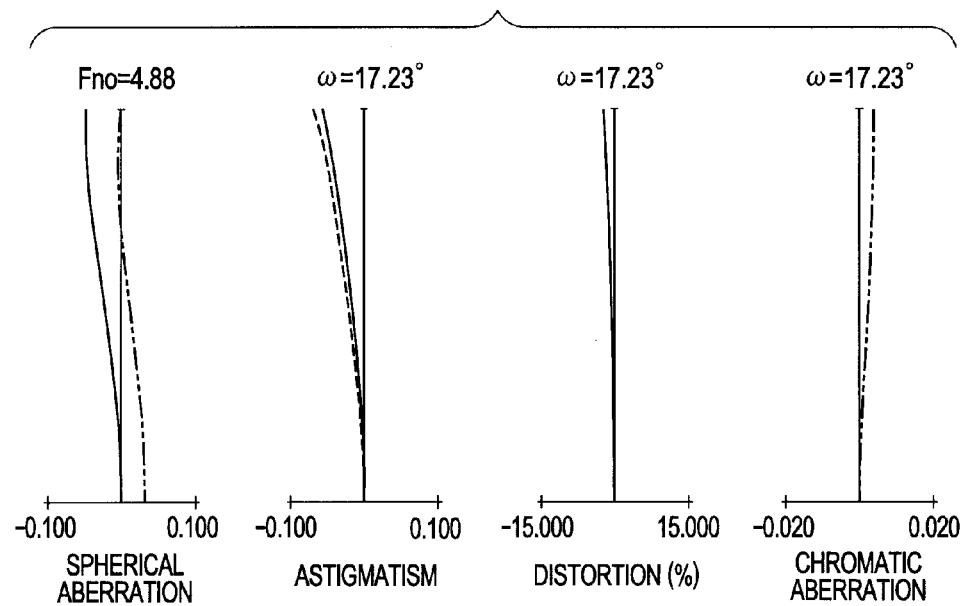
Figure 2C:
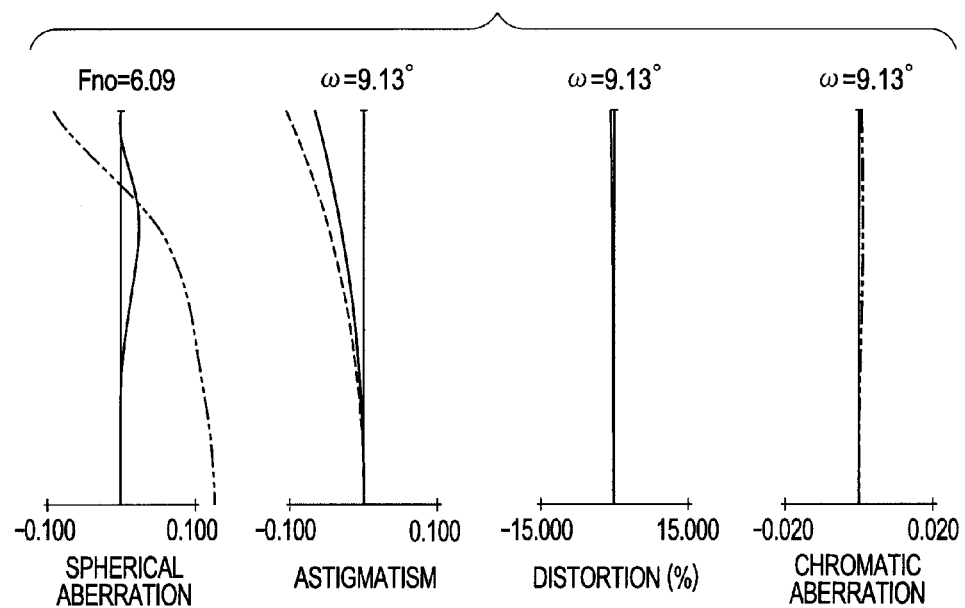
Figure 3:
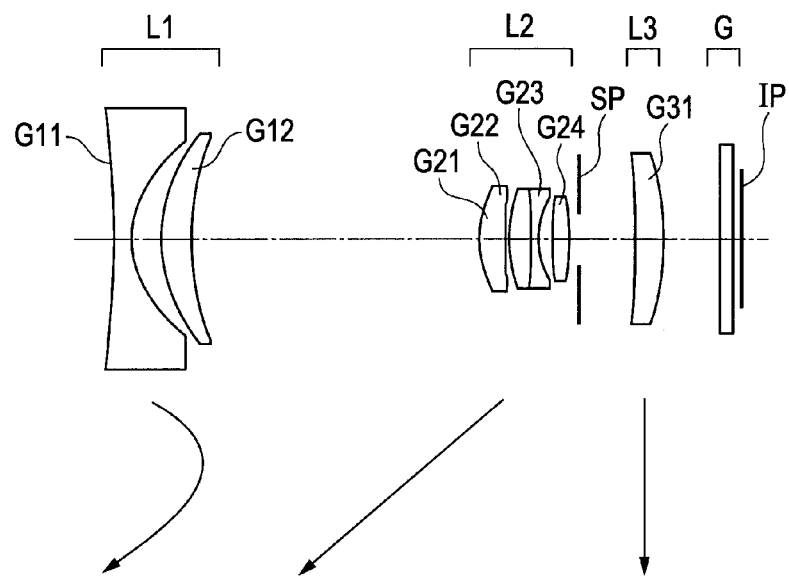
FIG. 3 is a cross sectional view of a zoom lens according to numerical embodiment 2 of the present invention.
Figure 4A:
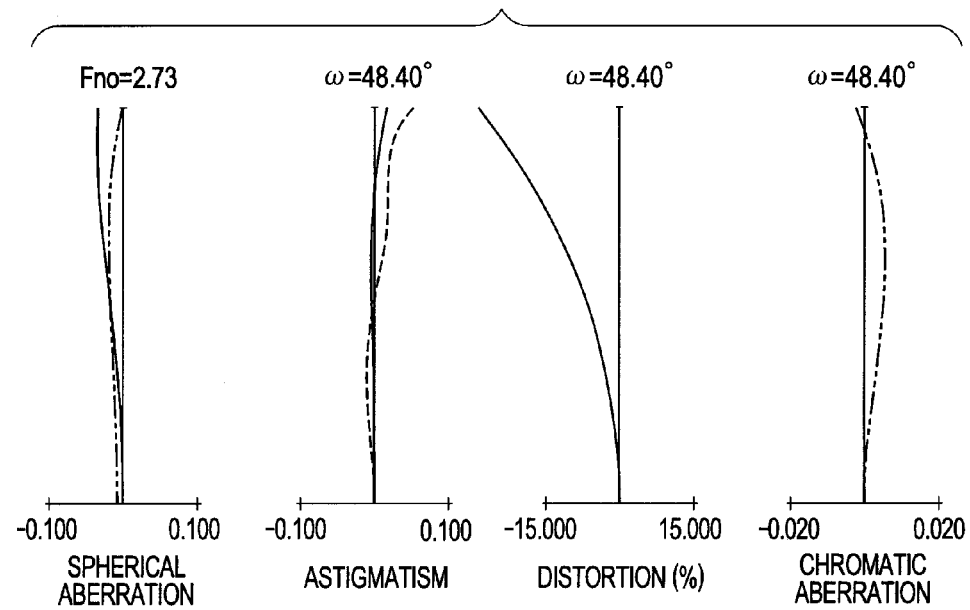
Figure 5:
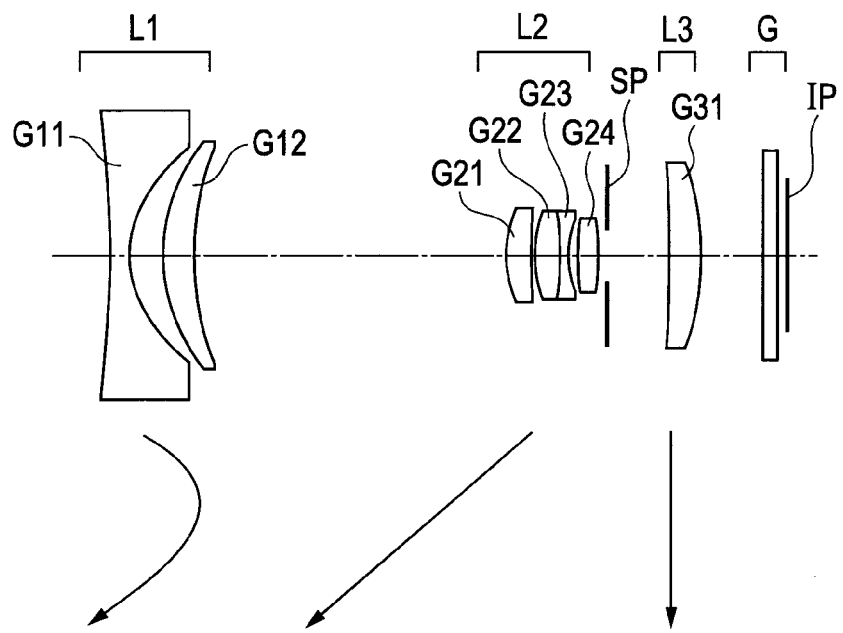
FIG. 5 is a cross sectional view of a zoom lens according to numerical embodiment 3 of the present invention.
Figure 6A:
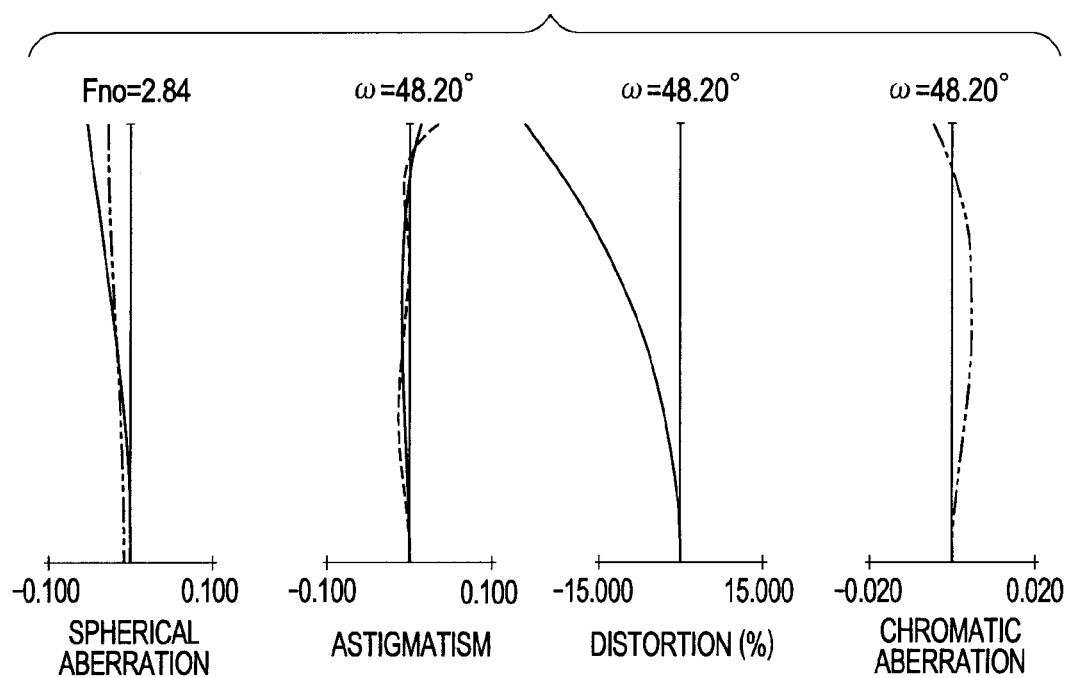
Figure 7:
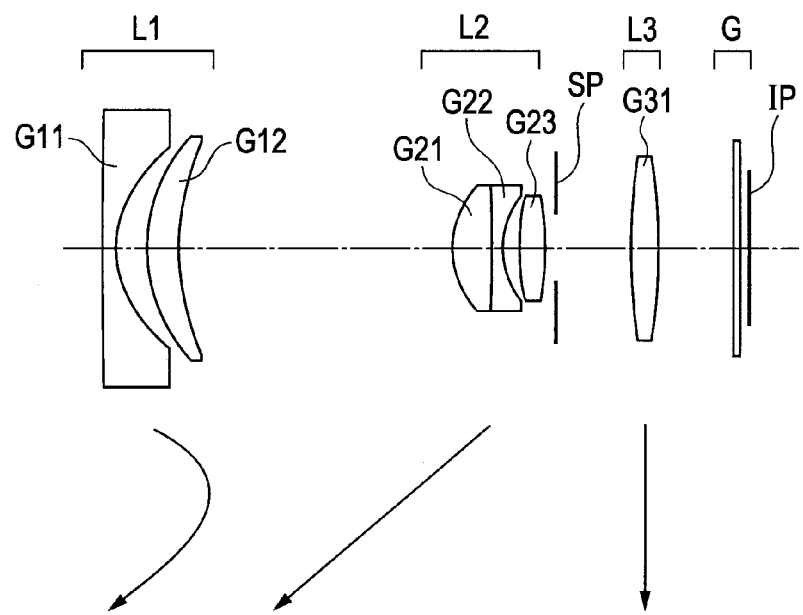
FIG. 7 is a cross sectional view of a zoom lens according to numerical embodiment 4 of the present invention.
Figure 8A:
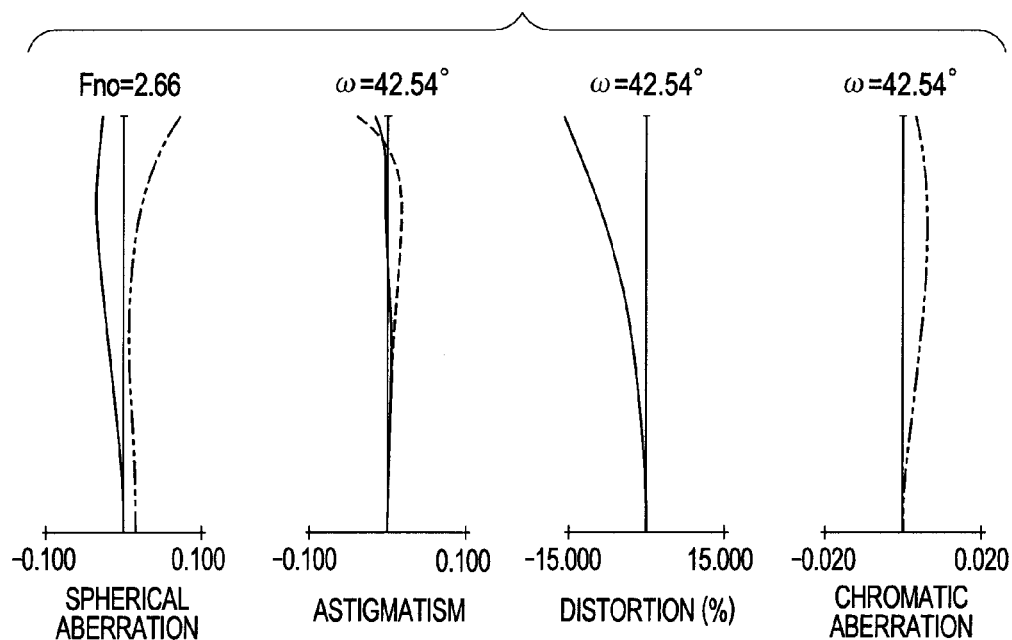
FIGS. 8A, 8B, and 8C are aberration diagrams of numerical embodiment 4 of the present invention respectively at the wide angle end, at an intermediate zoom position, and at the telephoto end.
Figure 8B:
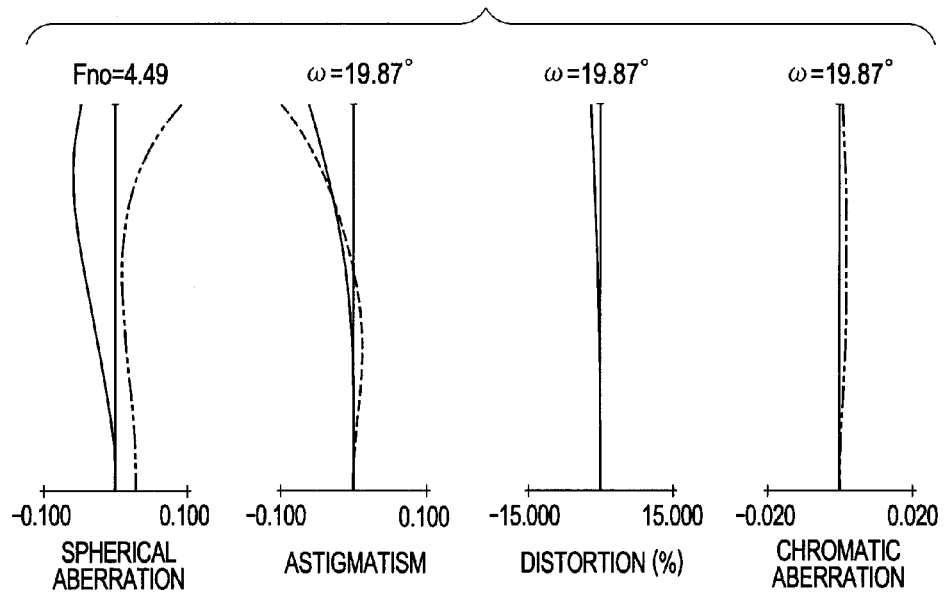
Figure 8C:
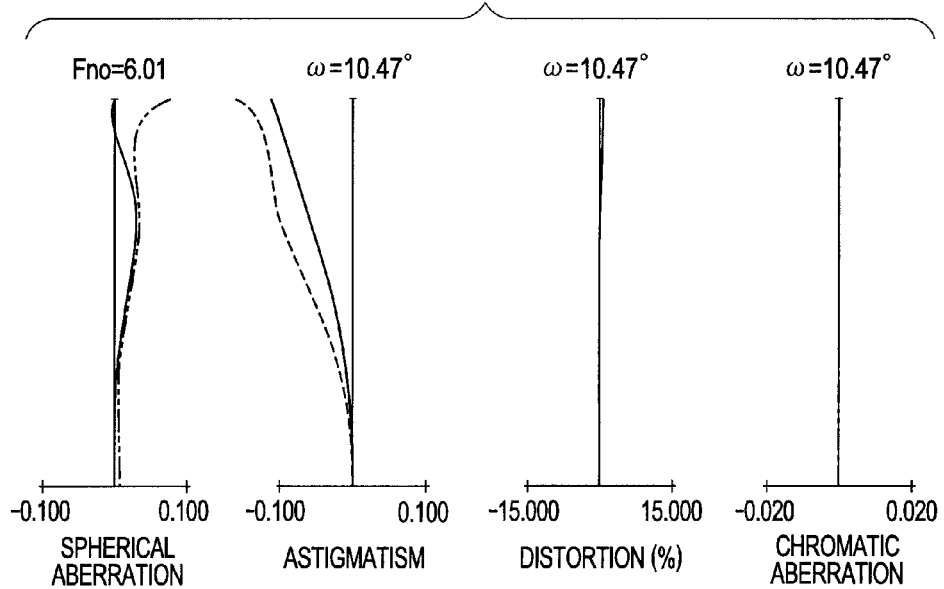
Figure 9:
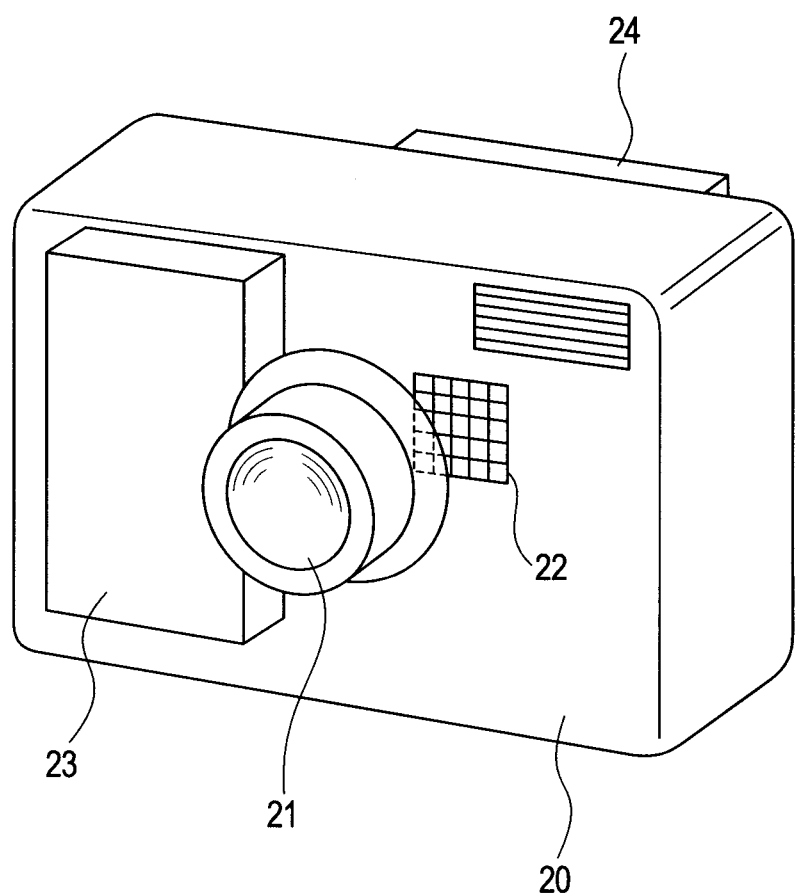
FIG. 9 is a perspective view schematically illustrates relevant portions of an image pickup apparatus according to the present invention.

FIG. 1 is a cross sectional view of a zoom lens according to a first embodiment of the present invention at the wide angle end of the zoom range (i.e. at the shortest focal length). FIGS. 2A, 2B and 2C show aberrations of the zoom lens according to the first embodiment at the wide angle end, at an intermediate zoom position and at the telephoto end (i.e. at the longest focal length) respectively. The zoom lens according to the first embodiment has a zoom ratio of 4.75 and an aperture ratio (F-number) of 2.88 to 6.09. FIG. 3 is a cross sectional view of a zoom lens according to a second embodiment of the present invention at the wide angle end. FIGS. 4A, 4B and 4C show aberrations of the zoom lens according to the second embodiment at the wide angle end, at an intermediate zoom position and at the telephoto end respectively. The zoom lens according to the second embodiment has a zoom ratio of 6.20 and an aperture ratio of 2.73 to 6.96. FIG. 5 is a cross sectional view of a zoom lens according to a third embodiment of the present invention at the wide angle end. FIGS. 6A, 6B and 6C show aberrations of the zoom lens according to the third embodiment at the wide angle end, at an intermediate zoom position and at the telephoto end respectively. The zoom lens according to the third embodiment has a zoom ratio of 4.82 and an aperture ratio of 2.84 to 6.08. FIG. 7 is a cross sectional view of a zoom lens according to a fourth embodiment of the present invention at the wide angle end. FIGS. 8A, 8B and 8C show aberrations of the zoom lens according to the fourth embodiment at the wide angle end, at an intermediate zoom position and at the telephoto end respectively. The zoom lens according to the fourth embodiment has a zoom ratio of 4.74 and an aperture ratio of 2.66 to 6.01. FIG. 9 is a schematic view showing relevant portions of a digital camera equipped with a zoom lens according to the present invention.

The zoom lenses according to the embodiments are taking lens systems for use in image pickup apparatuses. In the cross sectional views of the zoom lenses, the left side is the object side (or the front side), and the right side is the image side (or the rear side). In the cross sectional views, grouping of lenses constituting each lens unit is indicated by Li (i=1, 2 and 3, in order from the object side to the image side). In the following the zoom lenses according to the first to fourth embodiments will be described. The zoom lenses shown in the cross sectional views of FIGS. 1, 3, 5 and 7 each have a first lens unit L1 having a negative refractive power, a second lens unit L2 having a positive refractive power and a third lens unit L3 having a positive refractive power. Here, the refractive power refers to the optical power that is equal to the reciprocal of the focal length.

Each of the zoom lenses according to the embodiments has an F-number determining member SP (which will be also referred to as an "aperture stop" hereinafter) that functions as an aperture stop that defines (or restricts) the open F-number beams or the beams at full aperture. The aperture stop SP is disposed on the image side of the second lens unit L2. Each of the zoom lenses according to the embodiments has an optical block G such as an optical filter, a face plate, a quartz low pass filter, and/or an infrared cut filter. Also illustrated in the cross sectional views is the image plane IP, in which the image pickup surface of a solid state image pickup element (photo-electric conversion element) such as a CCD sensor or a CMOS sensor is placed when the zoom lens is used as a taking optical system of a video camera or a digital still camera.

When the zoom lens is used as a taking optical system of a film camera, the photosensitive surface of the film is placed in the image plane.

In the aberration diagrams showing spherical aberration, the solid lines represent spherical aberration with respect to the d-line, and the long dashed double-short dashed lines represent spherical aberration with respect to the g-line. In the aberration diagrams showing astigmatism, the solid lines are for the meridional image surface, and the broken lines are for the sagittal image surface. The aberration diagrams showing chromatic aberration are with respect to the g-line.

In each of the zoom lenses according to the embodiments, at a time of zooming from the wide angle end to the telephoto end, the first lens unit L1 moves to-and-fro along a locus convex toward the image side, the second lens unit L2 moves toward the object side, and the third lens unit L3 moves toward the image side. At a time of zooming, the lens units move in such a way that the distance between the first lens unit L1 and the second lens unit L2 is smaller at the telephoto end than at the wide angle end, and the distance between the second lens unit L2 and the third lens unit L3 is larger at the telephoto end than at the wide angle end. In each of the zoom lenses according to the embodiments, the magnification is changed mainly by shifting the second lens unit L2, and a shift of the image point with the magnification change is compensated by shifting the first lens unit L1 forward or backward.

The zoom lenses according to the embodiments have a negative-lead refractive power arrangement in which the first lens unit L1 has a negative refractive power. With this refractive power arrangement, a wide field angle and small front lens diameter will be achieved while providing a necessary length of back focus. The third lens unit L3 has a positive refractive power to provide a sufficiently large distance between the exit pupil and the image plane and to make the angle of incidence of rays on the solid state image pickup element small. In consequence, shading on the solid state image pickup element can be made small. The focusing operation from an object at infinity to an object at a short distance is performed by shifting the third lens unit L3 toward the object side. Alternatively, the focusing operation may be performed by shifting the first lens unit L1. The F-number determining member SP is disposed on the image side of the second lens unit L2 with respect to the direction of the optical axis. Disposing the aperture stop SP in this way allows a reduction in the distance between the first lens unit L1 and the second lens unit L2 at the telephoto end. In consequence, the second lens unit L2 can move over a sufficiently large distance toward the object side for zooming. Therefore, an increase in the overall length of the zoom lens will be prevented while achieving a high zoom ratio.

In each embodiment, the following conditions are satisfied:

$$0.35 < |f1|/ft < 0.55 \qquad (1), \text{ and}$$

$$1.80 < Npa \qquad (2),$$

where f1 is the focal length of the first lens unit L1, ft is the focal length of the entire system at the telephoto end, and Npa is the average of the refractive indices of the materials of all the lenses having a positive refractive power (all the positive lenses) in the entire system.

Condition (1) relates to the focal length of the first lens unit L1. If the focal length of the first lens unit L1 is so large that the upper limit of condition (1) is exceeded, in other words, if the refractive power of the first lens unit L1 is so low that the upper limit of condition (1) is exceeded, the effect of bending off-axis beams will become weak at the wide angle end. Since the effective optical diameter of the first lens unit L1 is determined by off-axis beams at the wide angle end, the weakness in the effect of bending off-axis beams at the wide angle end will lead to an increase in the lens diameter in the first lens unit L1. Then, it will be difficult to reduce the overall size of the system.

If the focal length of the first lens unit L1 is so small that the lower limit of condition (1) is not reached, in other words, if the refractive power of the first lens unit L1 is so high that the lower limit of condition (1) is not reached, large aberrations such as curvature of field, distortion and lateral chromatic aberration will be generated in the first lens unit L1 at the wide angle end of the zoom range, undesirably.

Condition (2) relates to the average of the refractive indices of the materials of all the positive lenses in the entire system. The Petzval sum is defined as the sum of the refractive powers of the lenses divided by the refractive indices of the respective lenses. In order to make the curvature of field small throughout the entire zoom range, it is effective to make the Petzval sum small. In order to make the Petzval sum small without increasing the number of lenses, it will be effective to use positive lenses each made of a material having a high refractive index. If the average of the refractive indices of the materials of the positive lenses is so small that the lower limit of condition (2) is not reached, the Petzval sum will be unduly large. This will lead to high curvature of field undesirably. It is more desirable that the numerical ranges of conditions (1) and (2) be set as follows:

$$0.38 < |f1|/ft < 0.54 \quad (1a), \text{ and}$$

$$1.810 < Npa \quad (2a).$$

As described above, according to the embodiments, zoom lenses having a wide field angle and well-corrected aberrations that are small in overall size are obtained by appropriately selecting the focal length of the first lens unit L1 and the refractive indices of the materials of the positive lenses in the entire system. In the embodiments, it is more preferred that one or more of the following conditions be further satisfied:

$$3.00 < fpa/fw < 4.00 \quad (3),$$

$$1.80 < Nna \quad (4),$$

$$-0.30 < fna/ft < -0.10 \quad (5),$$

$$0.30 < f2/ft < 0.55 \quad (6),$$

$$0.80 < f3/ft < 1.30 \quad (7),$$

$$0.70 < M2/ft < 1.10 \quad (8),$$

$$35.0 < vpa < 43.0 \quad (9), \text{ and}$$

$$30.0 < vna < 33.0 \quad (10),$$

where fpa is the average of the focal lengths of all the positive lenses in the entire system, vpa is the Abbe constants of the materials of all the positive lenses in the entire system, Nna is the average of the refractive indices of all the negative lenses in the entire system, vna is the Abbe constants of the materials of all the negative lenses in the entire system, fna is the average of the focal lengths of all the negative lenses in the entire system, f2 is the focal length of the second lens unit L2, f3 is the focal length of the third lens unit L3, fw is the focal length of the entire system at the wide angle end, M2 is the amount of shift (or shift distance) of the second lens unit L2 at a time of zooming from the wide angle end to the telephoto end (M2 being a positive value).

Condition (3) relates to the average of the focal lengths of the positive lenses in the entire system. If the average of the focal lengths is so large that the upper limit of condition (3) is exceeded, the refractive powers of the positive lenses are averagely low. Then, it will be difficult to achieve a wide angle of view and compactness in overall size. If the average of the focal lengths is so small that the lower limit of condition (3) is not reached, the refractive powers of the positive lenses are averagely high. Then, it will be difficult to make the Petzval sum small even if materials having high refractive indices are used in the positive lenses, thus leading to large curvature of field undesirably.

Condition (4) relates to the average refractive index of the materials of all the negative lenses in the entire system. To achieve a reduction in the effective diameter of the front lens by increasing the refractive power of the first lens unit L1, it is necessary to increase the refractive power of the negative lens in the first lens unit L1. This will lead to an increase in high order curvature of field generated by the negative lens in the wide angle zoom range and an increase in spherical aberration generated by the negative lens in the telephoto zoom range. In order to achieve achromatism (i.e. correction of chromatic aberration) while making the overall length of the zoom lens short by the second lens unit having a high refractive power, it is necessary for the negative lens in the second lens unit L2 to have a somewhat high refractive power. If the refractive power of the negative lens in the second lens unit is high, large spherical aberration and coma will be generated throughout the entire zoom range. To eliminate these disadvantages, it is necessary that the negative lenses in the entire system be made of materials having a relatively high average refractive index. If the lower limit of condition (4) is not reached, it will be difficult to satisfactorily correct high order curvature of field, spherical aberration and coma in the wide angle zoom range while making the overall size of the system small.

Condition (5) relates to the average focal length of all the negative lenses in the entire system. Since the lens system as a whole has a positive refractive power, the Petzval sum tends to be positive. Increasing the refractive power of the negative lenses can change the Petzval sum toward the negative side. If the average refractive power of the negative lenses is so low that the lower limit of the condition (5) is not reached, it will be difficult to change the Petzval sum toward the negative side or to decrease the Petzval sum, and curvature of field will become high. If the average refractive power of the negative lenses is so high that the upper limit of condition (5) is exceeded, large high order curvature of field, spherical aberration and coma will be generated by the first lens unit L1 and the second lens unit L2 in the wide angle zoom range, and it will be difficult to correct these aberrations satisfactorily.

Condition (6) relates to the focal length of the second lens unit L2. If the focal length of the second lens unit L2 is so long that the upper limit of condition (6) is exceeded, in other words, if the refractive power of the second lens unit L2 is so low that the upper limit of conditional condition (6) is exceeded, the distance over which the second lens unit L2 needs to move in order to achieve a high zoom ratio will become large. Then, the overall optical length of the system at the telephoto end will become large, and it will difficult to make the overall size small. On the other hand, if the focal length of the second lens unit L2 is so short that the lower limit of condition (6) is not reached, in other words, if the refractive power of the second lens unit L2 is so high that the lower limit of conditional condition (6) is not reached, it will be difficult to make the Petzval sum small even if materials having high refractive indices are used. In particular in the case where the system is composed of a small number of lenses, it will be difficult to make the overall size of the system small and to achieve correction of curvature of field.

Condition (7) relates to the focal length of the third lens unit L3. If the focal length of the third lens unit L3 is so high that the upper limit of condition (7) is exceeded, in other words if the refractive power of the third lens unit L3 is so low that the upper limit of condition (7) is exceeded, the effect of shifting the exit pupil away from the image plane will decrease. Consequently, a significant degree of shading will occur when the zoom lens is used with a solid state image pickup element. In addition, in the case where the focusing operation is performed by shifting the third lens unit L3, the amount of shift of the third lens unit L3 for focusing will becomes large, thus making a reduction in the overall size of the system difficult. If the focal length of the third lens unit L3 is so low that the lower limit of condition (7) is not reached, in other words if the refractive power of the third lens unit L3 is so high that the lower limit of condition (7) is not reached, the Petzval sum will become large, thus leading to an undesirable increase in curvature of field. However, if the number of positive lenses in the third lens unit L3 is increased to decrease the Petzval sum, it will become difficult to make the overall size of the system small.

Condition (8) relates to the amount of shift of the second lens unit L2 at a time of zooming from the wide angle end to the telephoto end. If the amount of shift is so large that the upper limit of condition (8) is exceeded, the overall optical length at the telephoto end will be large, and it will be difficult to make the overall size of the system small. If the amount of shift is so small that the lower limit of condition (8) is not reached, the second lens unit L2 will be necessitated to have a high refractive power in order to achieve a desired zoom ratio. Then, large aberrations such as spherical aberration, coma and curvature of field will be generated by the second lens unit L2. If the number of lenses in the second lens unit L2 is increased to correct these aberrations, it will become difficult to make the overall size of the system small. If conditions (6) and (8) are both satisfied, it will be easy to provide a system that is small in overall size and has a high zoom ratio.

Condition (9) relates to the average Abbe constant of the materials of all the positive lenses in the entire system. There are few existing low-dispersion optical materials that have a high refractive index. If the average Abbe constant of the materials of the positive lenses is so large that the upper limit of condition (9) is exceeded, in other words, if the materials of the positive lens exhibit low dispersion on average, it will be difficult for them to have a high refractive index. Then, it will be difficult to make the Petzval sum small. In particular in the case where the refractive powers of the lens units are designed to be high to make the overall size of the system small, it will be difficult to correct curvature of field excellently with a small number of lenses. If the average Abbe constant of the materials of the positive lenses is so small that the lower limit of condition (9) is not reached, in other words, if the materials of the positive lens exhibit high dispersion on average, large chromatic aberration will be generated. For example, axial chromatic aberration will be generated by the second lens unit L2, and lateral chromatic aberration will be generated by the third lens unit L3.

Condition (10) relates to the average Abbe constant of the materials of all the negative lenses in the entire system. If the average Abbe constant of the materials of the negative lenses is so large that the upper limit of condition (10) is exceeded, in other words, if the materials of the negative lens have low dispersion on average, the effect of achromatism by the negative lens in the second lens unit L2 will become low, thus resulting in insufficient correction of axial chromatic aberration throughout the entire zoom range. There are few existing low-dispersion optical materials that have a high refractive index. Therefore, if the material of the negative lens in the first lens unit L1 has significantly low dispersion, increasing the refractive power in order to reduce the overall size of the system will lead to large curvature of field in the wide angle zoom range and large spherical aberration in the telephoto zoom range. On the other hand, if the average Abbe constant of the negative lenses is so small that the lower limit of condition (10) is not reached, the material of the negative lens in the second lens unit L2 will have high dispersion, thus generating large secondary spectrum.

High dispersion materials generally have a high relative partial dispersion. Consequently, if a high dispersion material is used, achromatism will be over-corrective in the short wavelength range, thus tending to cause color fringing in or near the blue region. Moreover, if the material of the negative lens in the first lens unit L1 has significantly high dispersion, large lateral chromatic aberration will be generated.

It is more preferred that the numerical ranges of conditions (3) to (10) be further limited as follows:

$$3.10 < fpa/fw < 3.85 \quad (3a),$$

$$1.81 < Nna \quad (4a),$$

$$-0.27 < fna/ft < -0.15 \quad (5a),$$

$$0.35 < f2/ft < 0.53 \quad (6a),$$

$$0.85 < f3/ft < 1.25 \quad (7a),$$

$$0.80 < M2/ft < 1.00 \quad (8a),$$

$$36.0 < vpa < 42.8 \quad (9a), \text{ and}$$

$$31.0 < vna < 32.9 \quad (10a),$$

According to the embodiments as described above, there can be provided zoom lenses that are small in overall size, have a high zoom ratio of 4.7 or higher, and have excellent optical performance with small curvature of field throughout the zoom range.

In the following, the lens configurations in the embodiments will be described. In all the embodiments, the first lens unit L1 includes, in order from the object side to the image side, a negative lens G11 having a concave surface facing the image side and a positive lens G12 having a convex surface facing the object side. With this configuration, the effective diameter of the front lens is made small, and chromatic aberration is corrected excellently. The negative lens G11 and the positive lens G12 are each made of a material having a high refractive index. With the use of a material having a high refractive power, the curvature of the lens surfaces can be made relatively low while achieving a desired refractive power, thus decreasing aberrations such as curvature of field in the wide angle zoom range and spherical aberration in the telephoto zoom range. In addition, the positive lens G12 is made of a high dispersion material having a small Abbe constant so that the difference in the Abbe constant between the negative lens G11 and the positive lens G12 is large. Thus, chromatic aberration is corrected with a refractive power that is not so high. Furthermore, both surfaces of the negative lens G11 are aspheric surfaces, thus excellently correcting curvature of field and astigmatism in the wide angle zoom range while achieving a wide field angle and small overall size. The same effects will be obtained even if only the image side lens surface of the negative lens G11 is an aspheric surface.

In the first to third embodiments, the second lens unit L2 includes, in order from the object side to the image side, a positive lens G21 having a convex surface facing the object side, a cemented lens having a negative refractive power made up of a positive lens G22 and the negative lens G23, and a positive lens G24. In the fourth embodiment, the second lens unit L2 includes, in order from the object side to the image side, a cemented lens having a positive refractive power made up of a positive lens G21 and a negative lens G22, and a positive lens G23. In all the embodiments, the positive lenses in the second lens unit L2 are each made of a material having a high refractive index. With the use of a material having a high refractive index, the lens can be made slim, and the Petzval sum can be made small. Thus, curvature of field can be corrected excellently. In order to achieve a high zoom ratio, it is necessary for the second lens unit L2 to have a high refractive power. The positive lenses each made of a material having high refractive index facilitate achieving flat field. Moreover, the negative lens in the second lens unit L2 is also made of a material having a high refractive index. Thus, spherical aberration and coma are corrected excellently.

In all the embodiments, the third lens unit L3 includes a positive lens G31. Since the third lens unit L3 is composed of one lens, it is light in weight and easy to drive. This enables quick focusing operation. The positive lens G31 in the third lens unit L3 is made of a material having a high refractive index. With the use of a material having a high refractive index, the lens can be made slim, and the Petzval sum can be made small. In the zoom lenses according to the embodiments, any one of the lens units may be moved in directions perpendicular to the optical system to shift the imaging position, thereby stabilizing the image when camera shakes.

In the following, numerical embodiments 1 to 4 corresponding to the first to fourth embodiments of the present invention will be described. In the numerical embodiments, there are presented the surface number i of the optical surfaces counted from the object side, the radius of curvature ri of the i-th lens surface counted from the object side, the lens thickness or air distance di between the i-the optical surface and the (i+1)-th optical surface, the refractive index ndi of the material between the i-the optical surface and the (i+1)-th optical surface with respect to the d-line, the Abbe constant vdi of the material between the i-the optical surface and the (i+1)-th optical surface. In table 1, the values associated with the above-described conditions are presented for all the numerical embodiments. The aspheric surface shapes are expressed by the following equation in a coordinate system with an X axis taken along the direction of the optical axis with its positive direction oriented in the direction of propagation of rays and an H axis taken along a direction perpendicular to the optical axis:

$$X = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12},$$

where R is the paraxial radius of curvature, K is a conic constant, A4, A6, A8, A10 and A12 are aspheric coefficients. In the data of the numerical embodiments, the expressions like "e+X" and "e−X" stands for "$10^{+X}$" and "$10^{-X}$" respectively. The back focus BF is the distance from the last lens surface to the paraxial image plane expressed in the equivalent air length. The overall lens length (OLL) is the sum of the distance from the frontmost lens surface to the last lens surface and the back focus BF. The aspheric surfaces are marked by an asterisk suffixed to the surface number.

[Numerical Embodiment 1]
Lengths in the following tables are in millimeters.

Surface data

| surface number | r | d | nd | vd |
|---|---|---|---|---|
| 1* | −70.070 | 1.00 | 1.84954 | 40.1 |
| 2* | 6.688 | 1.91 | | |
| 3 | 10.503 | 1.53 | 1.94595 | 18.0 |
| 4 | 20.495 | (variable) | | |
| 5* | 6.820 | 1.60 | 1.85135 | 40.1 |
| 6 | 222.233 | 0.20 | | |
| 7 | 8.056 | 1.25 | 1.80400 | 46.6 |
| 8 | 44.556 | 0.50 | 1.80809 | 22.8 |
| 9 | 3.925 | 0.95 | | |
| 10* | 317.377 | 1.30 | 1.76802 | 49.2 |
| 11* | −18.077 | 0.50 | | |
| 12 (stop) | ∞ | (variable) | | |
| 13 | 32.356 | 1.50 | 1.71300 | 53.9 |
| 14 | −30.223 | (variable) | | |
| 15 | ∞ | 0.80 | 1.51633 | 64.1 |
| 16 | ∞ | (variable) | | |
| image plane | ∞ | | | |

Aspheric Surface Data

1st surface

K = −3.87519e+001   A4 = 1.00832e−005   A6 = 2.70500e−006
A8 = −5.94864e−008   A10 = 2.56058e−010   A12 = 1.73400e−012

2nd surface

K = −1.39145e+000   A4 = 3.56819e−004   A6 = 7.55304e−006
A8 = −1.43040e−007   A10 = 2.05905e−009   A12 = −4.52444e−011

5th surface

K = −2.27089e−001   A4 = −3.07024e−004   A6 = −6.29064e−006
A8 = 2.04588e−007   A10 = −2.35144e−008

10th surface

K = 4.87266e+002   A4 = 4.43585e−004   A6 = 3.53534e−005
A8 = −7.59402e−006   A10 = 5.32148e−007

11th surface

K = 0.00000e+000   A8 = −6.73754e−006

Various Data
zoom ratio 4.75

| | wide angle | intermediate | telephoto |
|---|---|---|---|
| focal length | 5.11 | 12.76 | 24.25 |
| F number | 2.88 | 4.88 | 6.09 |
| field angle | 37.74 | 17.23 | 9.13 |
| image height | 3.33 | 3.88 | 3.88 |
| OLL | 36.91 | 33.79 | 42.83 |
| BF | 3.94 | 3.93 | 3.93 |
| d4 | 15.76 | 4.17 | 0.50 |
| d12 | 4.97 | 13.45 | 26.17 |
| d14 | 3.00 | 3.00 | 2.99 |
| d16 | 0.41 | 0.41 | 0.41 |

Zoom Lens Unit Data

| unit | first surface | focal length |
|---|---|---|
| 1 | 1 | −11.77 |
| 2 | 5 | 10.46 |
| 3 | 13 | 22.14 |
| 4 | 15 | ∞ |

[Numerical Embodiment 2]
Lengths in the following tables are in millimeters.

Surface data

| surface number | r | d | nd | vd |
|---|---|---|---|---|
| 1* | −44.832 | 1.00 | 1.85135 | 40.1 |
| 2* | 5.532 | 1.71 | | |
| 3 | 9.187 | 1.70 | 2.14352 | 17.8 |
| 4 | 15.592 | (variable) | | |
| 5* | 5.840 | 1.50 | 1.84954 | 40.1 |
| 6 | 39.435 | 0.20 | | |
| 7 | 7.635 | 1.30 | 1.80400 | 46.6 |
| 8 | −24.443 | 0.40 | 2.00069 | 25.5 |
| 9 | 4.418 | 0.81 | | |
| 10 | 30.828 | 1.00 | 1.77250 | 49.6 |
| 11 | −12.982 | 0.50 | | |
| 12 (stop) | ∞ | (variable) | | |
| 13* | −57.286 | 1.60 | 1.85135 | 40.1 |
| 14 | −15.718 | (variable) | | |
| 15 | ∞ | 0.80 | 1.51633 | 64.1 |
| 16 | ∞ | (variable) | | |
| image plane | ∞ | | | |

Aspheric Surface Data

1st surface

K = 2.85740e+001  A4 = 4.88252e−005  A6 = 2.26281e−006
A8 = −2.20405e−008  A10 = 3.86222e−011  A12 = 6.15933e−013

2nd surface

K = −2.12045e+000  A4 = 1.13127e−003  A6 = −1.43808e−005
A8 = 5.91585e−007  A10 = −6.99870e−009  A12 = −9.44669e−011

5th surface

K = −1.87340e−001  A4 = −2.68563e−004  A6 = −6.31462e−006
A8 = 1.13177e−007  A10 = −1.92335e−008

13th surface

K = −8.69856e+001  A4 = −3.21620e−005  A6 = −9.74850e−006
A8 = 4.74513e−007  A10 = −8.69199e−009

Various Data
zoom ratio 6.20

| | wide angle | intermediate | telephoto |
|---|---|---|---|
| focal length | 3.71 | 11.38 | 23.00 |
| F number | 2.73 | 4.72 | 6.96 |
| field angle | 48.40 | 19.36 | 9.65 |
| image height | 2.98 | 3.88 | 3.88 |
| OLL | 35.48 | 31.46 | 41.55 |
| BF | 4.10 | 4.02 | 3.90 |
| d4 | 16.43 | 3.59 | 0.45 |
| d12 | 3.24 | 12.14 | 25.49 |
| d14 | 3.18 | 3.10 | 2.97 |
| d16 | 0.40 | 0.40 | 0.40 |

Zoom Lens Unit Data

| unit | first surface | focal length |
|---|---|---|
| 1 | 1 | −9.24 |
| 2 | 5 | 9.03 |
| 3 | 13 | 25.00 |
| 4 | 15 | ∞ |

[Numerical Embodiment 3]
Lengths in the following tables are in millimeters.

Surface data

| surface number | r | d | nd | vd |
|---|---|---|---|---|
| 1* | −46.123 | 1.00 | 1.85135 | 40.1 |
| 2* | 5.587 | 1.72 | | |
| 3 | 9.005 | 1.60 | 2.14352 | 17.8 |
| 4 | 15.203 | (variable) | | |
| 5* | 5.879 | 1.30 | 1.88300 | 40.8 |
| 6 | 47.019 | 0.20 | | |
| 7 | 7.484 | 1.30 | 1.80400 | 46.6 |
| 8 | −19.726 | 0.40 | 2.00069 | 25.5 |
| 9 | 4.223 | 0.54 | | |
| 10 | 26.114 | 1.00 | 1.88300 | 40.8 |
| 11 | −18.947 | 0.50 | | |
| 12 (stop) | ∞ | (variable) | | |
| 13* | −98.523 | 1.60 | 1.85135 | 40.1 |
| 14 | −14.626 | (variable) | | |
| 15 | ∞ | 0.80 | 1.51633 | 64.1 |
| 16 | ∞ | (variable) | | |
| image plane | ∞ | | | |

Aspheric Surface Data

1st surface

K = 2.85563e+001  A4 = 1.20740e−004  A6 = 1.53578e−006
A8 = −3.05476e−008  A10 = 1.74873e−011  A12 = 2.69089e−012

2nd surface

K = −2.14357e+000  A4 = 1.24873e−003  A6 = −9.22520e−006
A8 = 5.07448e−007  A10 = −1.21724e−008  A12 = 2.31457e−011

5th surface

K = −1.00914e−001  A4 = −2.66821e−004  A6 = −3.80277e−006
A8 = −5.18226e−007  A10 = 5.11737e−008

13th surface

K = −4.65118e+001  A4 = −1.09598e−004  A6 = −5.43218e−006
A8 = 3.22289e−007  A10 = −6.60458e−009

Various Data
zoom ratio 4.82

| | wide angle | intermediate | telephoto |
|---|---|---|---|
| focal length | 3.71 | 9.35 | 17.88 |
| F number | 2.84 | 3.98 | 6.08 |
| field angle | 48.20 | 23.29 | 12.21 |
| image height | 2.98 | 3.88 | 3.88 |
| OLL | 34.53 | 29.99 | 36.42 |
| BF | 4.07 | 4.02 | 3.94 |
| d4 | 16.08 | 4.93 | 1.43 |
| d12 | 3.22 | 9.89 | 19.90 |
| d14 | 3.15 | 3.10 | 3.02 |
| d16 | 0.40 | 0.40 | 0.40 |

Zoom Lens Unit Data

| unit | first surface | focal length |
|---|---|---|
| 1 | 1 | −9.51 |
| 2 | 5 | 8.99 |
| 3 | 13 | 20.00 |
| 4 | 15 | ∞ |

[Numerical Embodiment 4]
Lengths in the following tables are in millimeters.

Surface data

| surface number | r | d | nd | vd |
|---|---|---|---|---|
| 1* | 71.823 | 0.70 | 1.85135 | 40.1 |
| 2* | 4.942 | 1.57 | | |
| 3 | 8.165 | 1.60 | 2.14352 | 17.8 |
| 4 | 12.516 | (variable) | | |
| 5* | 4.276 | 2.00 | 1.85135 | 40.1 |
| 6 | −69.577 | 0.50 | 1.84666 | 23.9 |
| 7 | 3.930 | 0.86 | | |

-continued

[Numerical Embodiment 4]
Lengths in the following tables are in millimeters.

| | | | | |
|---|---|---|---|---|
| 8* | 14.422 | 1.30 | 1.69350 | 53.2 |
| 9* | −13.292 | 0.50 | | |
| 10(stop) | ∞ | (variable) | | |
| 11* | 32.703 | 1.40 | 1.58313 | 59.4 |
| 12* | −25.889 | (variable) | | |
| 13 | ∞ | 0.30 | 1.51633 | 64.1 |
| 14 | ∞ | (variable) | | |
| image plane | ∞ | | | |

Aspheric Surface data

1st surface

| | | |
|---|---|---|
| K = −7.60738e+000 | A4 = −2.51609e−004 | A6 = 3.30714e−006 |
| A8 = 2.76967e−008 | A10 = −2.09909e−010 | A12 = −8.28712e−012 |

2nd surface

| | | |
|---|---|---|
| K = −9.58544e−001 | A4 = 1.13637e−004 | A6 = −3.36396e−006 |
| A8 = −6.19198e−008 | A10 = 3.35657e−008 | A12 = −7.26049e−010 |

5th surface

| | | |
|---|---|---|
| K = −5.51061e−001 | A4 = 2.56388e−004 | A6 = 7.94199e−007 |
| A8 = 2.16781e−006 | A10 = −1.77496e−007 | |

8th surface

| | | |
|---|---|---|
| K = −3.96218e+001 | A4 = 1.23838e−003 | A6 = −6.66587e−005 |
| A8 = −2.15450e−005 | A10 = 6.59771e−006 | |

9th surface

| | | |
|---|---|---|
| K = −4.23984e+000 | A4 = −3.06864e−004 | A6 = 9.60640e−005 |
| A8 = −3.20785e−005 | A10 = 6.66292e−006 | |

11th surface

| | | |
|---|---|---|
| K = 1.06090e+001 | A4 = 1.10680e−004 | A6 = 5.94350e−007 |
| A8 = −2.71313e−007 | | |

12th surface

| | | |
|---|---|---|
| K = −1.09268e+002 | A4 = −4.06311e−004 | A6 = 2.57025e−005 |
| A8 = −7.41340e−007 | | |

Various Data
zoom ratio 4.74

| | wide angle | intermediate | telephoto |
|---|---|---|---|
| focal length | 4.43 | 10.96 | 21.00 |
| F number | 2.66 | 4.49 | 6.01 |
| field angle | 42.54 | 19.87 | 10.47 |
| image height | 3.41 | 3.88 | 3.88 |
| OLL | 32.41 | 29.61 | 37.32 |
| BF | 4.50 | 4.31 | 4.02 |
| d4 | 13.71 | 3.58 | 0.30 |
| d10 | 3.78 | 11.30 | 22.58 |
| d12 | 3.78 | 3.59 | 3.30 |
| d14 | 0.52 | 0.52 | 0.52 |

Zoom Lens Unit Data

| unit | first surface | focal length |
|---|---|---|
| 1 | 1 | −10.21 |
| 2 | 5 | 9.23 |
| 3 | 13 | 25.00 |
| 4 | 15 | ∞ |

TABLE 1

| | Embodiment 1 | Embodiment 2 | Embodiment 3 | Embodiment 4 |
|---|---|---|---|---|
| Condition (1) | 0.485 | 0.402 | 0.532 | 0.486 |
| Condition (2) | 1.816 | 1.884 | 1.913 | 1.818 |
| Condition (3) | 3.363 | 3.741 | 3.449 | 3.225 |
| Condition (4) | 1.829 | 1.926 | 1.929 | 1.849 |

TABLE 1-continued

| | Embodiment 1 | Embodiment 2 | Embodiment 3 | Embodiment 4 |
|---|---|---|---|---|
| Condition (5) | −0.258 | −0.205 | −0.259 | −0.253 |
| Condition (6) | 0.431 | 0.393 | 0.503 | 0.439 |
| Condition (7) | 0.913 | 1.087 | 1.119 | 1.190 |
| Condition (8) | 0.874 | 0.958 | 0.926 | 0.872 |
| Condition (9) | 41.6 | 38.8 | 37.2 | 42.6 |
| Condition (10) | 31.5 | 32.8 | 32.8 | 32.0 |

In the following, an embodiment of a digital still camera (i.e. image pickup apparatus) that uses as a taking optical system a zoom lens according to the present invention will be described with reference to FIG. 9. In FIG. 9, the digital still camera includes a camera body 20 and a taking optical system 21, which is a zoom lens according to the present invention. The digital still camera also has a solid state image pickup element (or photo electric conversion element) 22 such as a CCD sensor or a CMOS sensor provided in the camera body to receive an object image formed by the taking optical system 21, a memory 23 for storing information representing the object image obtained by photoelectric conversion by the solid state image pickup element 22, and a viewfinder 24 composed of a liquid crystal display panel or the like to allow a user to observe the object image formed on the solid state image pickup element 22. As described above, a compact image pickup apparatus having high optical performance can be provided by using the zoom lens according to the present invention in the image pickup apparatus such as a digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-290046, filed Dec. 27, 2010, which is hereby incorporated by reference herein in its entirety.

What is claimed is:

1. A zoom lens comprising, in order from an object side to an image side, a first lens unit having a negative refractive power, a second lens unit having a positive refractive power, and a third lens unit having a positive refractive power, wherein at a time of zooming from the wide angle end to the telephoto end, the lens units move in such a way that the distance between the first lens unit and the second lens unit decreases and the distance between the second lens unit and the third lens unit increases, and the zoom lens satisfies the following conditions:

$$0.35 < |f1|/ft < 0.55,$$

$$1.80 < Npa,$$

$$3.10 < fpa/fw < 4.00, \text{ and}$$

$$30.0 < vna < 33.0,$$

where ft is the focal length of the entire system at the telephoto end, f1 is the focal length of the first lens unit, Npa is the average of the refractive indices of the materials of all the positive lenses in the entire system, fpa is the average of the focal lengths of all the positive lenses in the entire system, and fw is the focal length of the entire system at the wide angle end, and vna is the average of the Abbe constants of the materials of all the negative lenses in the entire system.

2. A zoom lens according to claim 1, wherein the zoom lens satisfies the following condition:

$$1.80 < Nna,$$

where Nna is the average of the refractive indices of the materials of all the negative lenses in the entire system.

3. A zoom lens according to claim 1, wherein the zoom lens satisfies the following condition:

$$-0.30 < fna/ft < -0.10,$$

where fna is the average of focal lengths of all the negative lenses in the entire system.

4. A zoom lens according to claim 1, wherein the zoom lens satisfies the following condition:

$$0.30 < f2/ft < 0.55,$$

where f2 is the focal length of the second lens unit.

5. A zoom lens according to claim 1, wherein the zoom lens satisfies the following condition:

$$0.80 < f3/ft < 1.30,$$

where f3 is the focal length of the third lens unit.

6. A zoom lens according to claim 1, wherein the zoom lens satisfies the following condition:

$$0.70 < M2/ft < 1.10,$$

where M2 is the amount of shift of the second lens unit during zooming from the wide angle end to the telephoto end.

7. A zoom lens according to claim 1, wherein the zoom lens satisfies the following condition:

$$35.0 < vpa < 43.0,$$

where vpa is the average of the Abbe constants of the materials of all the positive lenses in the entire system.

8. A zoom lens according to claim 1, wherein the third lens unit moves toward the object side at a time of focusing from an object at infinity to an object at a short distance.

9. An image pickup apparatus comprising:
a zoom lens; and
an photoelectric conversion element that receives an image formed by the zoom lens,
wherein the zoom lens comprises, in order from an object side to an image side,
a first lens unit having a negative refractive power,
a second lens unit having a positive refractive power, and
a third lens unit having a positive refractive power,
wherein at a time of zooming from the wide angle end to the telephoto end, the lens units move in such a way that the distance between the first lens unit and the second lens unit decreases and the distance between the second lens unit and the third lens unit increases, and the zoom lens satisfies the following conditions:

$$0.35 < |f1|/ft < 0.55, \text{ and}$$

$$1.80 < Npa,$$

$$3.10 < fpa/fw < 4.00, \text{ and}$$

$$30.0 < vna < 33.0,$$

where ft is the focal length of the entire system at the telephoto end, f1 is the focal length of the first lens unit, Npa is the average of the refractive indices of the materials of all the positive lenses in the entire system, fpa is the average of the focal lengths of all the positive lenses in the entire system, fw is the focal length of the entire system at the wide angle end, and vna is the average of the Abbe constants of the materials of all the negative lenses in the entire system.

10. A zoom lens comprising, in order from an object side to an image side, a first lens unit having a negative refractive power, a second lens unit having a positive refractive power, and a third lens unit having a positive refractive power, wherein at a time of zooming from the wide angle end to the telephoto end, the lens units move in such a way that the distance between the first lens unit and the second lens unit decreases and the distance between the second lens unit and the third lens unit increases,
wherein the first lens unit includes, in order from the object side to the image side, a negative lens, and a positive lens,
wherein the zoom lens satisfies the following conditions:

$$0.35 < |f1|/ft < 0.55,$$

$$1.80 < Npa,$$

$$3.10 < fpa/fw < 4.00,$$

where ft is the focal length of the entire system at the telephoto end, f1 is the focal length of the first lens unit, Npa is the average of the refractive indices of the materials of all the positive lenses in the entire system, fpa is the average of the focal lengths of all the positive lenses in the entire system, and fw is the focal length of the entire system at the wide angle end.

* * * * *